United States Patent [19]

Schubert

[11] 4,062,442
[45] Dec. 13, 1977

[54] SHUTOFF CONTROL APPARATUS FOR A CONVEYOR

[75] Inventor: Jürgen Schubert, Bochum, Germany

[73] Assignee: Gebr. Eickhoff, Maschinenfabrik und Eisengiesserei m.b.H., Bochum, Germany

[21] Appl. No.: 757,623

[22] Filed: Jan. 7, 1977

Related U.S. Application Data

[63] Continuation of Ser. No. 630,919, Nov. 11, 1975, abandoned.

[30] Foreign Application Priority Data

Nov. 11, 1974  Germany .............................. 2453294

[51] Int. Cl.² ............................................. B65G 43/00
[52] U.S. Cl. ...................................... 198/502; 198/856
[58] Field of Search ............... 198/468, 502, 505, 810, 198/855, 856

[56] References Cited

U.S. PATENT DOCUMENTS

| 2,883,035 | 4/1959 | Erisman | 198/502 |
|---|---|---|---|
| 3,608,703 | 4/1970 | Hitchcock et al. | 198/810 |
| 3,680,686 | 8/1972 | Ciesielski | 198/855 |

FOREIGN PATENT DOCUMENTS 1,228,561   11/1966   Germany ............................ 198/856

Primary Examiner—Evon C. Blunk
Assistant Examiner—Joseph E. Valenza
Attorney, Agent, or Firm—Thomas H. Murray

[57] ABSTRACT

A shutoff control apparatus is incorporated into a feed station where material is loaded onto a belt conveyor. The feed run of a conveyor belt is supported by interconnected roller assemblies forming a trough-shaped roller support at each of a plurality of spaced-apart locations where the roller supports are swingably carried by a stationary frame. A horizontally-arranged rectangular frame is supported by leaf springs within the stationary frame at a closely-spaced relation below the belt supporting roller assemblies. Plate members project upwardly from the rectangular frame to extend between the roller assemblies. A drive motor for the conveyor belt responds to a shutoff control switch which is actuated in response to movement by the rectangular frame. The frame moves when a sharp-edged object penetrates the conveyor belt and establishes a driving relation between the belt and one of the plate members together with a roller assembly. Means are provided for adjustably positioning the plate members and the movable frame within the stationary frame at the feed station.

11 Claims, 8 Drawing Figures

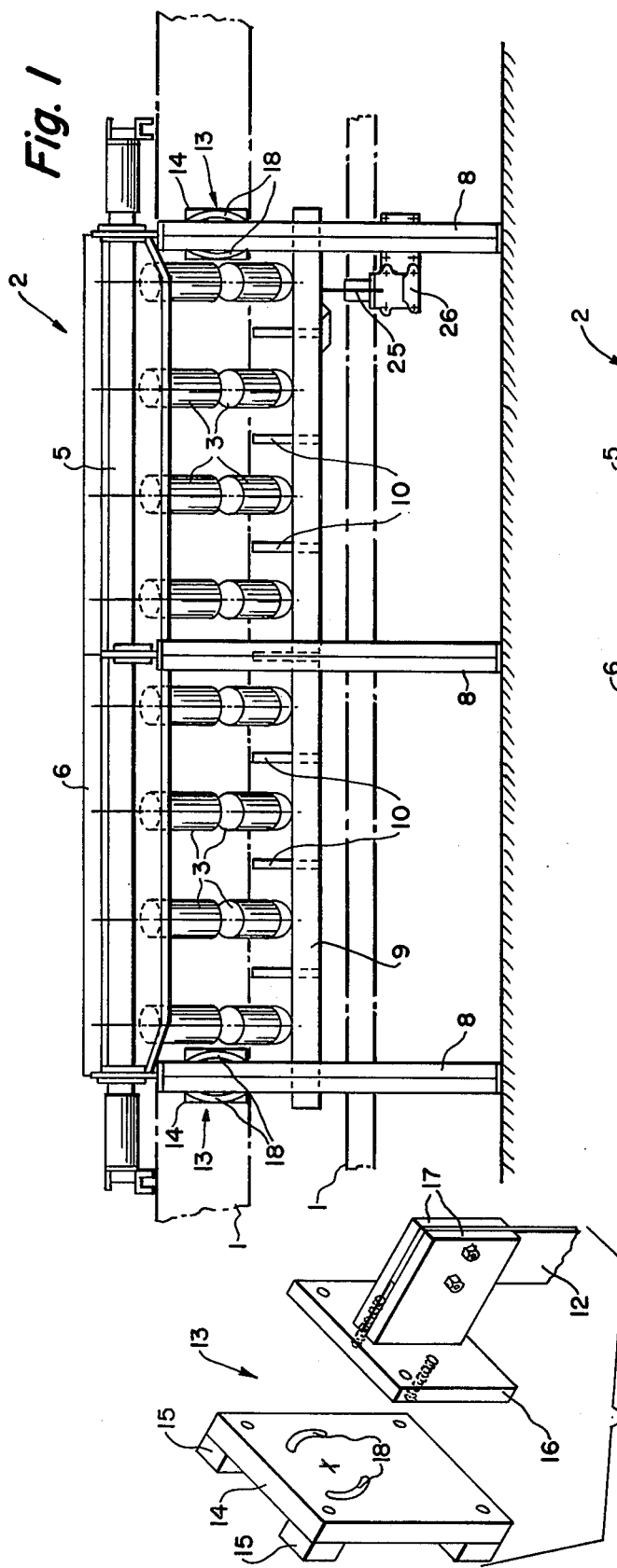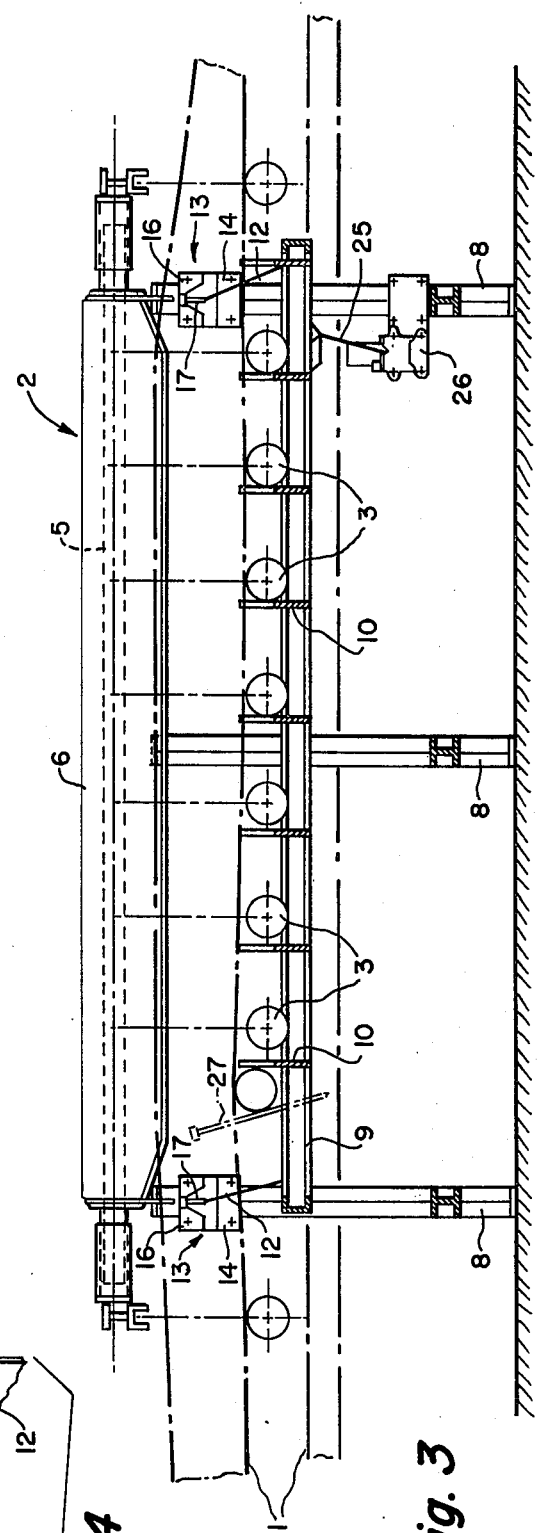

SHUTOFF CONTROL APPARATUS FOR A CONVEYOR

This is a continuation of application Ser. No. 630,919, filed Nov. 11, 1975, now abandoned.

BACKGROUND OF THE INVENTION

The present invention relates to a shutoff control for a conveyor having a feed station to load material onto the upper run of an endless conveyor belt while guided by trough-shaped roller supports which are, in turn, carried for swinging movement by a stationary frame. More specifically, the present invention provides means to detect the penetration by a foreign object into the conveyor belt for bringing the conveyor belt to a stop without further damage to the belt. The shutoff control apparatus is readily adaptable for incorporation into an existing installation while providing a very sensitive apparatus to detect penetration by a foreign object through the conveyor belt.

SUMMARY OF THE INVENTION

The apparatus of the present invention departs from known shutoff control devices by providing a movable frame within a feed station for a conveyor below trough-like roller supports for the conveyor belt. This frame is extended along the length of the feed station at a closely-spaced relation below the belt supporting roller assemblies where the frame is supported by a stationary frame for movement in the same direction as the travel by the conveyor belt. Plate members extend from this movable frame to lie in the gap formed between the spaced-apart locations of the trough-shaped arrangements of roller assemblies. This construction of parts advantageously permits the incorporation of a shutoff control apparatus into existing feed stations of a conveyor while at the same time providing a highly sensitive shutoff control apparatus. Relatively small forces on the conveyor belt are required when an object penetrates the belt to move the frame to a shutoff control position. As this position, the drive for the conveyor is stopped to avoid further damage to the conveyor belt.

According to a further feature of the present invention, the movable frame is suspended for swinging movement within the support frame of the feed station by employing at least two hangers or supports in the form of springs, preferably leaf springs. The springs are arranged to hold and guide the movable frame for displacement in the same direction as the travel by the conveyor belt while preventing unwanted swinging movement of the frame. The springs provide the further advantage that they are relatively maintenance-free while they hold and guide the frame without requiring longitudinally-slidable parts. The invention further provides that each spring is carried on a support member which is, in turn, attached to the structure forming part of the feed station.

The present invention further provides for the rotatable adjustment to the support member about an axis extending transversely to the movement by the conveyor belt in a manner to raise or lower the movable frame for maintaining the desired spaced relation below the conveyor belt. This construction of parts further provides adjustments to the position of the movable frame whereby plate members carried there by are positioned to lie in the gap between the trough-shaped arrangements of the roller assemblies. It is preferred to employ adjustable means at the connections between the stationary frame and a spring as well as between a spring and the movable frame. The adjustable interconnections with each leaf spring provide adjustments to the spring tension which determines the forward position of the movable frame below the conveyor belt. Each adjustable interconnection includes a clamp plate to support one end of the leaf spring to provide vertical adjustments which correspond with a rising or lowering to the position of the conveyor belt.

According to a further feature of the present invention, the movable frame is connected by adjustable means to the leaf springs. The movable frame includes openings spaced along in the direction of travel by the conveyor belt for adjusting the position at which the hangers are attached to the frame as well as to provide adjustability for members carried by the frame to extend into the gap between the trough-shaped arrangements of the rollers assemblies. Stop means associated with the stationary frame and with the movable frame hold the adjustable members against rotation. It is preferred to provide means to vertically adjust the plate members carried by the movable frame to further compensate for raising and falling movements by the conveyor belt.

These features and advantages of the present invention as well as others will be more fully understood when the following description is read in light of the accompanying drawings, in which:

FIG. 1 is a side elevational view of a feed station in a conveyor system incorporating the features of the present invention;

FIG. 3 is a sectional view taken along line III—III of FIG. 2;

FIG. 4 is an exploded perspective view illustrating the arrangement of parts for adjusting the position of the shutoff control apparatus according to the present invention;

Figure 2:
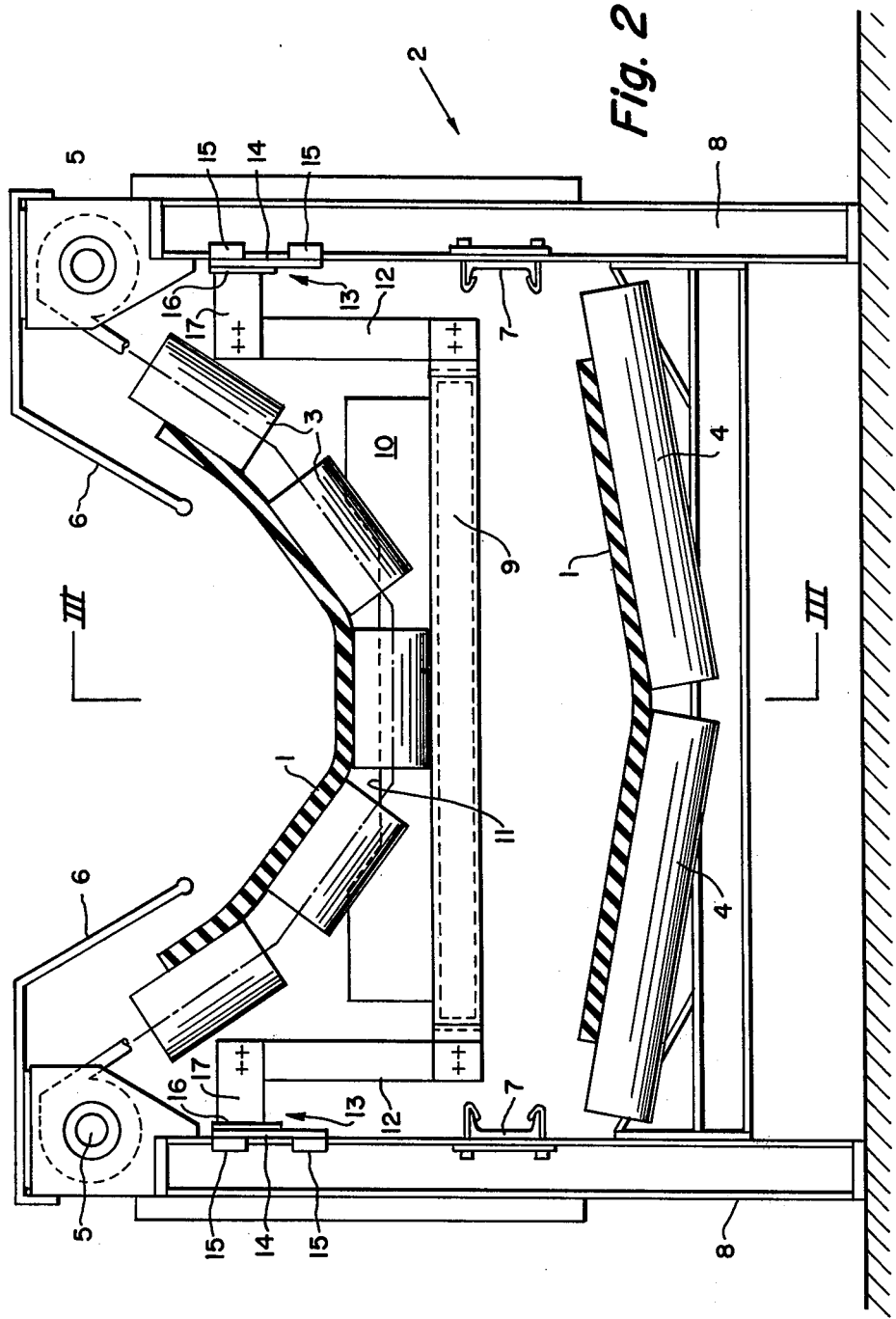
FIG. 2 is an end view of the feed station shown in FIG. 1.

In FIGS. 1-3, there is illustrated a portion of a conveyor system which includes an endless conveyor belt 1 that is driven by a suitable drive which includes an electrical motor that is controlled by the shutoff control apparatus of the present invention. The conveyor belt 1 passes through a feed station 2 along which the upper run of the conveyor belt is supported by trough-shaped arrangements of roller assemblies 3 with each trough arrangement incorporating five roller assemblies having arbor shafts which are flexibly interconnected in an end-to-end relation. The lower run of the conveyor belt is supported at the feed station by roller assemblies 4 having arbor shafts that are rotatably supported by the stationary frame of the feed station 2. Each trough-shaped arrangement of roller assemblies is swingably supported by longitudinal side beams 5 forming part of the stationary frame at the feed station 2. The beams 5 carry deflection plates 6 which extend along the length of the feed station in an overlying relation with the side edges of the conveyor belt at the feed run of the belt. The beams 5 form part of the stationary support frame at the feed station which further includes longitudinally-arranged beams 7 secured to vertical supports 8 extending from the floor at each side of the conveyor belt.

A rectangular frame 9 is horizontally arranged in a spaced relation below the roller assemblies 3. The frame 9 extends along the length of the feed station in an inwardly-spaced relation from the vertical supports 8. A plurality of individual plate members 10 is supported by the frame 9 at spaced-apart relations to extend transversely to the conveyor belt. Each of the members 10 is preferably made in the form of a metallic sheet to extend vertically into the gap formed between the spaced-apart relation of the trough-shaped arrangements of roller assemblies 3. Each plate member 10 includes a central recess in the top surface to conform the trough-like shape of the conveyor belt along its upper run.

Leaf springs 12 form the preferred type of suspension members employed to interconnect the frame 9 at its four corners with the stationary support frame. The leaf springs are each attached to their upper ends by clamp assemblies 13 to the vertical supports 8 of the stationary frame. As clearly illustrated in FIG. 2, the width of leaf springs 12 extends transversely to the direction of travel by the conveyor belt. The leaf springs provide a resilient restoring force to the frame 9 as well as the members 10 carried thereby when the frame 9 is deflected from its normal, essentially horizontal position. At the normal position of frame 9, the members 10 lie in the gap betweeen the trough-shaped arrangements of roller assemblies 3. The leaf springs 12 also provide a guiding function for the oscillatory movement of the frame 9 in the longitudinal direction corresponding to the direction of travel by the conveyor belt. At the same time, the springs prevent transverse movements by the frame.

As shown in FIGS. 1–4, each clamp assembly consists of a square plate 14 which is bolted through spacer blocks 15 to the sides of a vertical support 18. A holder plate 16 carries on its outer face surface two closely spaced-apart members 17 which extend from the face surface at right angles to the direction of travel by the conveyor belt. The upper end of leaf spring 12 is bolted between the members 17. Bolt and nut assemblies, not shown, are used to clamp the holder plates 16 to the square plate 14. For this purpose, discontinuous arcuate slots extend through the plate 14 and have a geometrical center corresponding to the axis of rotation of holder 16 relative to the square plate 14. This rotational axis forms the pivotal axis of adjustment for holder 16 whereby the leaf spring 12 is vertically adjusted to correspond to rising or falling movement by the conveyor belt. The adjustments to the position of holder 16 also determines the final position of frame 9 as well as the members 10 extending vertically therefrom.

Figure 5:
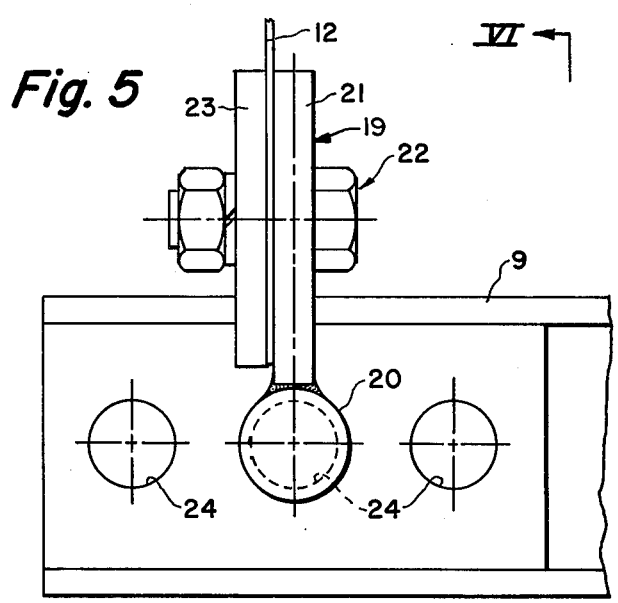
FIG. 5 is an enlarged detail view of an adjustable interconnection between a leaf spring and a movable frame forming part of the shutoff control apparatus of the present invention.
Figure 6:
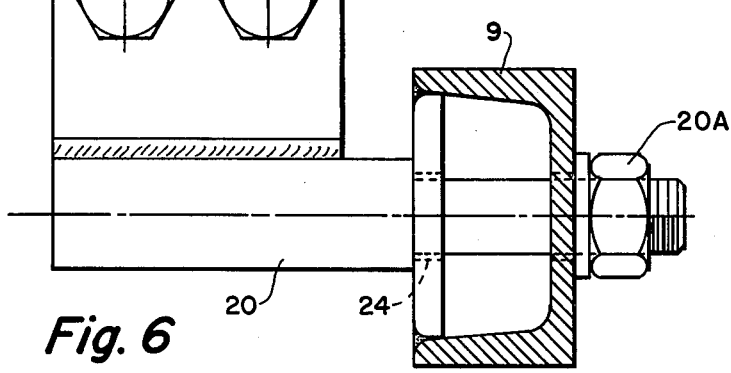
FIG. 6 is a sectional view taken along line VI—VI of FIG. 5.
Figure 7:
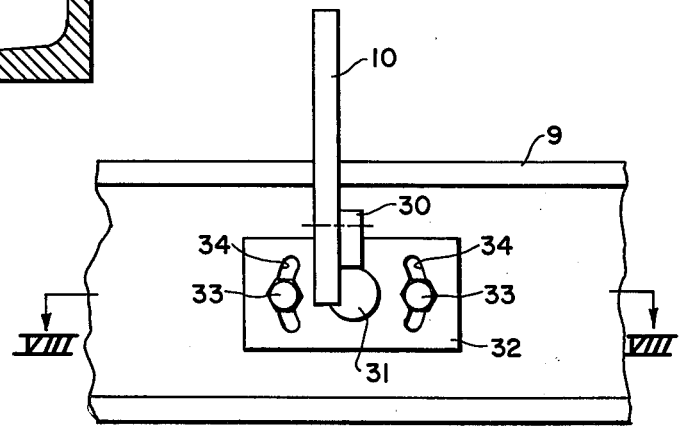
FIG. 7 is an enlarged view of the adjustable interconnection between a vertically-extending plate member and the movable frame.

As shown in FIGS. 5 and 6, holders 19 are provided to adjust the lower end of each leaf spring 12. Each holder 19 includes clamp plates 21 and 23 that receive bolt and nut assemblies 22 to secure the lower end of the leaf spring between the plates 21 and 23. The clamp plate 21 is welded to a rod 20 which has threaded ends adapted to pass through one of a plurality of closely spaced-apart holes 24 formed in side beams of the frame 9. The threaded end of rod 20 is either held by nut 20A for free rotational movement or the shaft 20 is held in a fixed position under a compression force developed by a predetermined torque applied to nut 20A. The position of members 10 relative to the roller assemblies 3 is controllably dependent on which of the holes 24 receives the threaded end of rod 20 because this effects the longitudinal disposition of frame 9 while supported by leaf springs 12.

Figure 8:
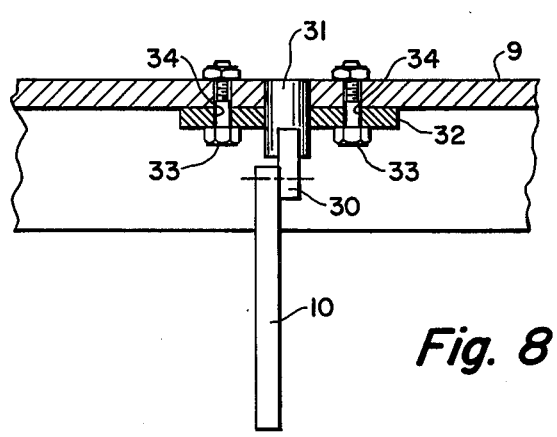
FIG. 8 is a sectional view taken along line VIII—VIII of FIG. 7.

FIGS. 8 and 9 illustrate the adjustable interconnection between members 10 and the frame 9 for rotatably positioning the members 10 about longitudinal axes. A block 30 is bolted onto the opposite ends of each plate member 10. A pin 31 is welded to each block 30 to extend through a hole in the frame 9. A plate 32 is fastened to each pin 31 to hold the plate member 10 in its desired position. Bolts 33 pass through slots 34 which lie on a circle which is concentric with the center of pin 31. A bolt and nut assembly 33 is used to clamp the plate 32 via slots 34 to the frame 9. In this way, the members 10 are vertically adjusted and secured to extend into the gap between the roller assemblies.

The frame 9, when longitudinally displaced, contacts a control arm 25 that, in turn, actuates a shutoff control switch 26 which is secured to a vertical support 8. During the process of conveying material along the feed run by the conveyor belt, if a sharp-edged object such as identified by reference numeral 27 in FIG. 3 should penetrate the conveyor belt at the feed station, the object will strike one of the roller assemblies 3 or one of the plate members 10. In either event, a driving relation is established between the conveyor belt and a plate member 10. Either a roller assembly 3 is displaced into contact with a plate member 10 or the plate member itself is displaced by the object 27 which, in turn, causes a displacement of the frame 9 in the direction of travel by the conveyor belt. When this occurs, the frame 9 actuates the shutoff control switch 26 via the arm 25 to thereby discontinue operation of the drive motor for the conveyor system.

The present invention provides that the holders 13 can be tightly clamped onto a vertical support 8 and that the frame 9 carries only the plate members 10 whereby this frame is lightly loaded and freely suspended for movement within the stationary frame at the feed station. In this way, the apparatus of the present invention is readily adaptable to existing feed stations of conveyor systems. The lightweight construction of the frame 9 not only reduces the production cost but also enables displacement of the frame by relatively small forces for rapid response to thereby limit damage to the conveyor belt to an unavoidable minimum.

Although the invention has been shown in connection with a certain specific embodiment, it will be readily apparent to those skilled in the art that various changes in form and arrangement of parts may be made to suit requirements without departng from the spirit and scope of the invention.

I claim as my invention:

1. A shutoff control apparatus for detecting tears by the penetration of an object through a conveyor belt at the feed run of a conveyor system, said apparatus including the combination of:
   an endless conveyor belt forming a feed run and a return run,
   a feed station including a stationary frame extending along in the direction of travel by said conveyor belt at the feed run thereof,
   a plurality of roller assemblies each having interconnected arbor shafts swingably carried at each of spaced-apart locations by said stationary frame for a trough-shaped support for said endless conveyor belt at the feed run, frame means extending within the stationary frame of said feed station, said frame means lying in a spaced relation below and independent of said roller assemblies, means to support said frame means for movement in a longitudinal direction within said stationary frame, members carried by said frame means while projecting upwardly therefrom at spaced-apart locations to lie in the gap formed between the spaced-apart locations of said plurality of roller assemblies, said members being disposed for engagement by an object penetrating the conveyor belt at the feed run, and means including a shutoff control switch responsive to movement of said frame means below said rollers relative to said stationary frame for controlling movement by said conveyor belt.

2. The shutoff control apparatus according to claim 1 wherein said means to support said frame means includes leaf springs carried at spaced-apart locations by said support frame to resiliently support said frame means.

3. The shutoff control apparatus according to claim 1 wherein said means to support said frame means includes resilient members interconnecting said support frame and said frame means at a plurality of spaced-apart locations.

4. The shutoff control apparatus according to claim 3 wherein said means to support said frame means further includes means for pivotally attaching each of said resilient members to said support frame.

5. The shutoff control apparatus according to claim 4 wherein each of said means for pivotally attaching is adjustably positioned about a horizontal axis extending transverse to the direction of travel by said conveyor belt.

6. The shutoff control apparatus according to claim 3 wherein for each of said resilient members, said means to support said frame means further includes a carrier plate support by said stationary frame, said carrier plate including discontinuous arcuate slot having a geometrical center defining a rotational axis for adjusting the position of said frame means, a holder plate carrying said resilient member, fastening means adapted to extend into the arcuate slots in said carrier plate to secure said holder plate onto said carrier plate after adjusting the holder plate about said rotational axis.

7. The shutoff control apparatus according to claim 3 wherein said means to support said frame means further includes means for pivotally attaching each resilient member to said frame means.

8. The shutoff control apparatus according to claim 3 wherein said means to support said frame means further includes a holder to interconnect at least one of said resilient members and said frame means.

9. The shutoff control apparatus according to claim 8 wherein said frame means includes openings closely spaced-apart along the direction of feed by said conveyor belt, said apparatus further including fastener means to secure said holder at one of the closely spaced-apart openings to said frame means.

10. The shutoff control apparatus according to claim 9 further including stop means to prevent rotational movement between said holder and said frame means.

11. The shutoff control apparatus according to claim 1 further including means for adjusting the angular position of said member carried by said frame means relative to said frame means.

* * * * *